(12) United States Patent
Gill

(10) Patent No.: US 7,333,305 B2
(45) Date of Patent: Feb. 19, 2008

(54) MAGNETORESISTIVE SENSOR WITH IN-STACK BIAS LAYER PINNED AT THE BACK EDGE OF THE SENSOR STRIPE

(75) Inventor: Hardayal Singh Gill, Palo Alto, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 376 days.

(21) Appl. No.: 11/187,675

(22) Filed: Jul. 22, 2005

(65) Prior Publication Data
US 2007/0019340 A1  Jan. 25, 2007

(51) Int. Cl.
*G11B 5/39* (2006.01)
(52) U.S. Cl. .................................. 360/324.12
(58) Field of Classification Search ............. 360/324.1, 360/324.11, 324.12, 324.2
See application file for complete search history.

(56) References Cited

U.S. PATENT DOCUMENTS

| | | | |
|---|---|---|---|
| 5,666,248 A | 9/1997 | Gill .............................. | 360/113 |
| 5,920,446 A | 7/1999 | Gill .............................. | 360/113 |
| 6,636,391 B2 * | 10/2003 | Watanabe et al. ........... | 360/321 |
| 6,710,984 B1 | 3/2004 | Yuasa et al. ............ | 360/324.11 |
| 6,721,147 B2 | 4/2004 | Aoshima et al. ........ | 360/324.12 |
| 6,738,235 B1 | 5/2004 | Mao ........................... | 360/324 |
| 6,754,056 B2 | 6/2004 | Ho et al. .................. | 360/324.2 |
| 6,801,411 B1 | 10/2004 | Lederman et al. ....... | 360/324.11 |
| 6,816,346 B2 | 11/2004 | Zheng et al. ............ | 360/324.1 |
| 7,035,062 B1 * | 4/2006 | Mao et al. ................ | 360/324.2 |
| 2003/0156361 A1 | 8/2003 | Li et al. .................. | 360/324.12 |
| 2003/0179520 A1 | 9/2003 | Hasegawa ............... | 360/324.12 |
| 2004/0061979 A1 * | 4/2004 | Ho et al. ..................... | 360/321 |
| 2004/0169962 A1 | 9/2004 | Zheng et al. ............. | 360/324.1 |
| 2004/0207959 A1 * | 10/2004 | Saito ........................ | 360/324.1 |
| 2004/0207960 A1 | 10/2004 | Saito et al. .............. | 360/324.1 |
| 2004/0207962 A1 | 10/2004 | Saito et al. ............. | 360/324.11 |

* cited by examiner

*Primary Examiner*—Jefferson Evans
(74) *Attorney, Agent, or Firm*—Zilka-Kotab, PC

(57) ABSTRACT

A magnetoresistive sensor having an in stack bias structure that extends beyond a stripe height edge defined by the free and pinned layers. The bias structure includes a magnetic bias layer that is magnetostatically coupled with the free layer by a non-magnetic spacer layer. The bias layer is pinned by an AFM layer that is disposed outside of the active area of the sensor beyond the stripe height edge. The AFM layer is exchange coupled with the bias layer on the same side of the bias layer that contacts the spacer layer. This reduces the gap height by moving the AFM layer up within the level of the other sensor layers.

22 Claims, 3 Drawing Sheets

MAGNETORESISTIVE SENSOR WITH IN-STACK BIAS LAYER PINNED AT THE BACK EDGE OF THE SENSOR STRIPE

FIELD OF THE INVENTION

The present invention relates to current perpendicular to plane (CPP) magnetoresistive sensors having a novel in stack free layer bias structure that provides improved free layer stability and decreased sensor thickness.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

In order to meet the ever increasing demand for improved data rate and data capacity, researchers have recently been focusing their efforts on the development of perpendicular recording systems. A traditional longitudinal recording system stores data as magnetic bits oriented longitudinally along a track in the plane of the surface of the magnetic disk. This longitudinal data bit is recorded by a fringing field that forms between a pair of magnetic poles separated by a write gap. A perpendicular recording system, on the other hand, records data as magnetic transitions oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole.

The advent of perpendicular recording systems has lead to an increased interest in current perpendicular to plane (CPP) sensors, which are particularly suited to use in perpendicular recording systems, due to their ability to read signals from a high coercivity medium. This is in part due to the short gap height afforded by such CPP sensors which allows them to read a very short bit of data. A CPP sensor differs from a more conventional current in plane (CIP) sensor such as that discussed above in that the sense current flows through the CPP sensor from top to bottom in a direction perpendicular to the plane of the layers making up the sensor. Whereas the more traditional CIP sensor has insulation layers separating it from the shields, the CPP sensor contacts the shields at its top and bottom surfaces, thereby using the shields as leads.

A challenge to constructing a practical CPP GMR sensor is the necessity of having an insulation layer at either side of the sensor. In a CPP sensor, sense is conducted from the top of the sensor to the bottom of the sensor perpendicular to the plane of the layers by leads that also may act as magnetic shields. In order to prevent current from being shunted from one lead to the other across the hard bias layers that typically extend from the sides of the sensor an insulation layer must be provided to cover the sides of the sensor and at least one of the leads. This insulation layer weakens the magnetostatic coupling between the bias layer and the free layer. Therefore, traditional hard bias layers, formed at either side of the sensor, are less effective in a CPP sensor.

One way to overcome the drawbacks of such hard bias layers in a CPP sensor design is to construct an in stack bias structure. In stack bias structures that have been proposed include a layer of magnetic material such as NiFe separated from the free layer by a spacer layer such as Ta. The magnetic layer, or biasing layer, is then exchange coupled with a layer of antiferromagnetic material (AFM layer) such as PtMn. Unfortunately however, in order to provide significant biasing, the magnetic layer (bias layer) must be very thick. For example, the bias layer must be 1.5 to 2 times the thickness of the free layer. The AFM layer itself must also be very thick, even thicker than the bias layer.

Unfortunately, such a thick magnetic layer exhibits poor exchange coupling with the AFM layer. Therefore, the bias structure described above, does not provide strong stable biasing. Also, as can be seen from the above description, such a bias structure must be very thick. This thick bias structure degrades sensor performance in a CPP sensor by increasing parasitic resistance. In a CIP sensor such a structure would also lead to current shunting. The thick in stack bias structure also uses a lot of gap thickness resulting in increased bit length and, therefore, to decrease data density.

Another problem confronted by current sensor designs is that as the track width of the sensor decreases, the magnetic properties of the ever smaller free layer become more unstable. Therefore, prior art biasing structures (whether hard magnetic or in stack) provide insufficient free layer biasing to stabilize the increasingly unstable free layer in such smaller sensors.

Therefore, there is a strong felt need for a practical in stack bias structure that can provide sufficiently strong and uniform free layer biasing while also maintaining a desirable low sensor stack thickness. Such a design would preferably provide sufficiently strong free layer biasing to prevent free layer instability at very a small track widths.

SUMMARY OF THE INVENTION

The present invention provides a magnetoresistive sensor having an in stack bias structure that provides robust biasing while reducing gap thickness. The sensor includes a free layer that terminates at a stripe height location as measured from the ABS. The distance between the ABS and the stripe height location defines an active area of the sensor. The in stack bias structure includes a magnetic bias layer and a non-magnetic spacer layer sandwiched between the free layer and the bias layer. The bias layer has a first side that is disposed toward the free layer and contacts the spacer layer. An antiferromagnetic (AFM) layer is exchange coupled with the bias layer on the first side of the bias layer. This AFM layer is disposed entirely outside of the active area of the sensor.

The present invention advantageously allows for reduced gap thickness by moving the AFM layer that pins the bias layer to be disposed within the elevation already consumed by the other sensor layer, rather than adding an additional level of material deposition.

If stronger pinning of the bias layer is required, another AFM layer can be exchange coupled with a second side of the bias layer (that opposite the spacer layer and free layer). This second AFM layer could be disposed both within the active area and beyond the active area of the sensor. In this case, the bias layer would be exchange coupled on both sides to AFM layers in its portion extending beyond the active area of the sensor.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
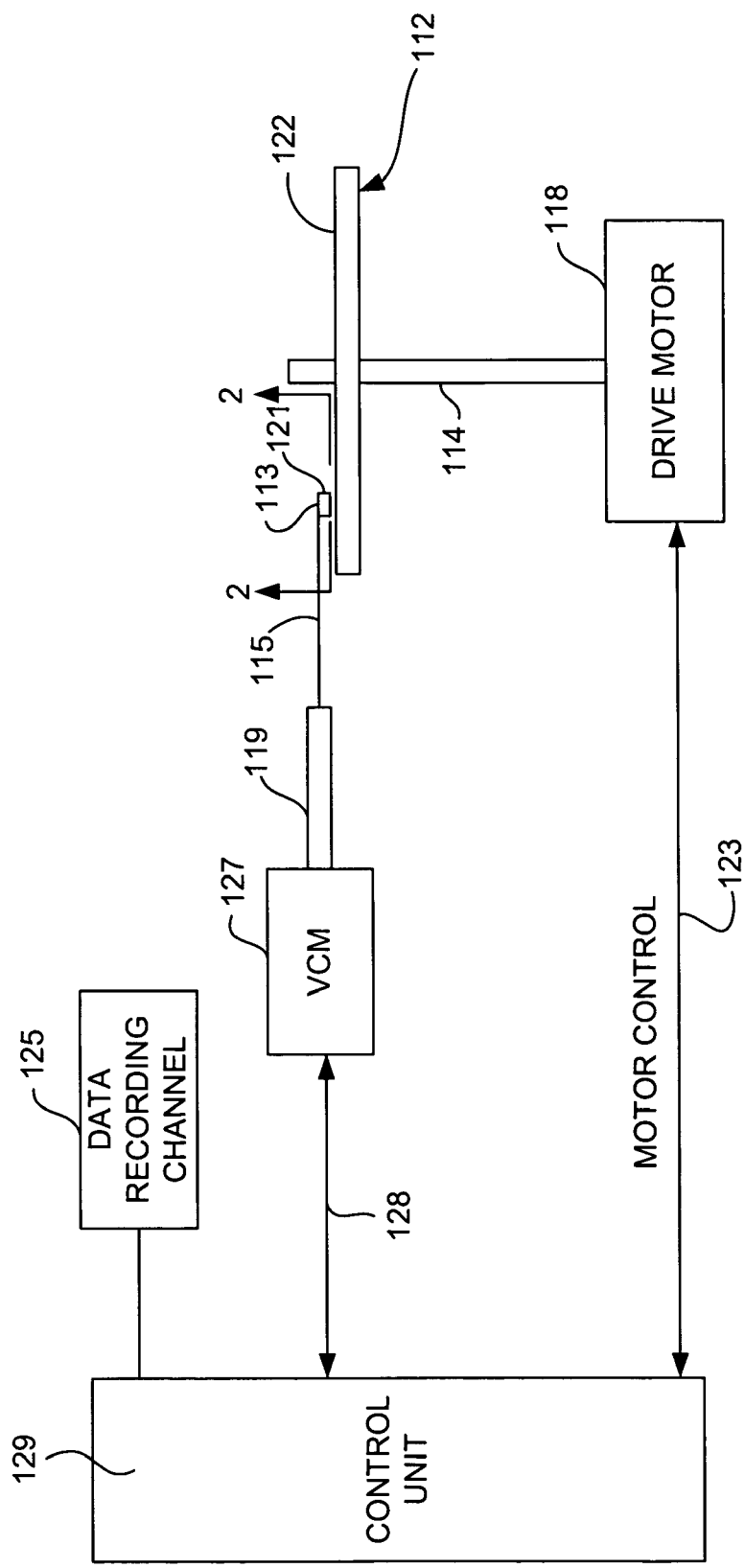
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
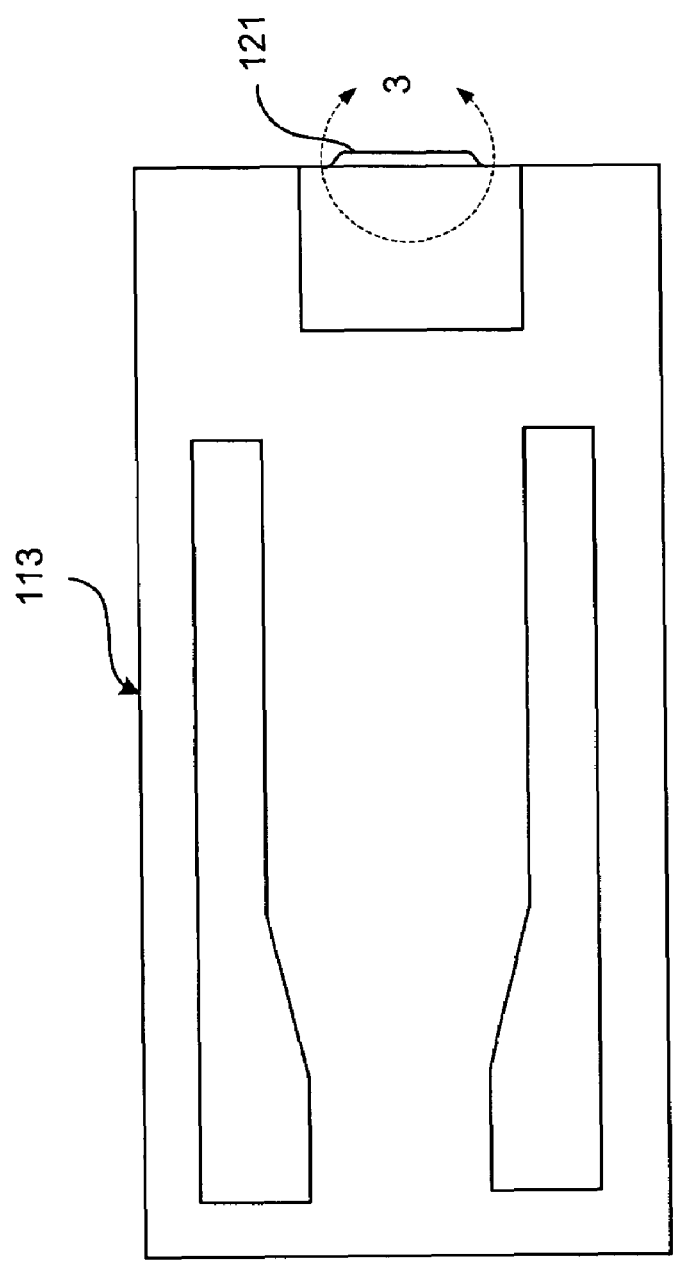
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
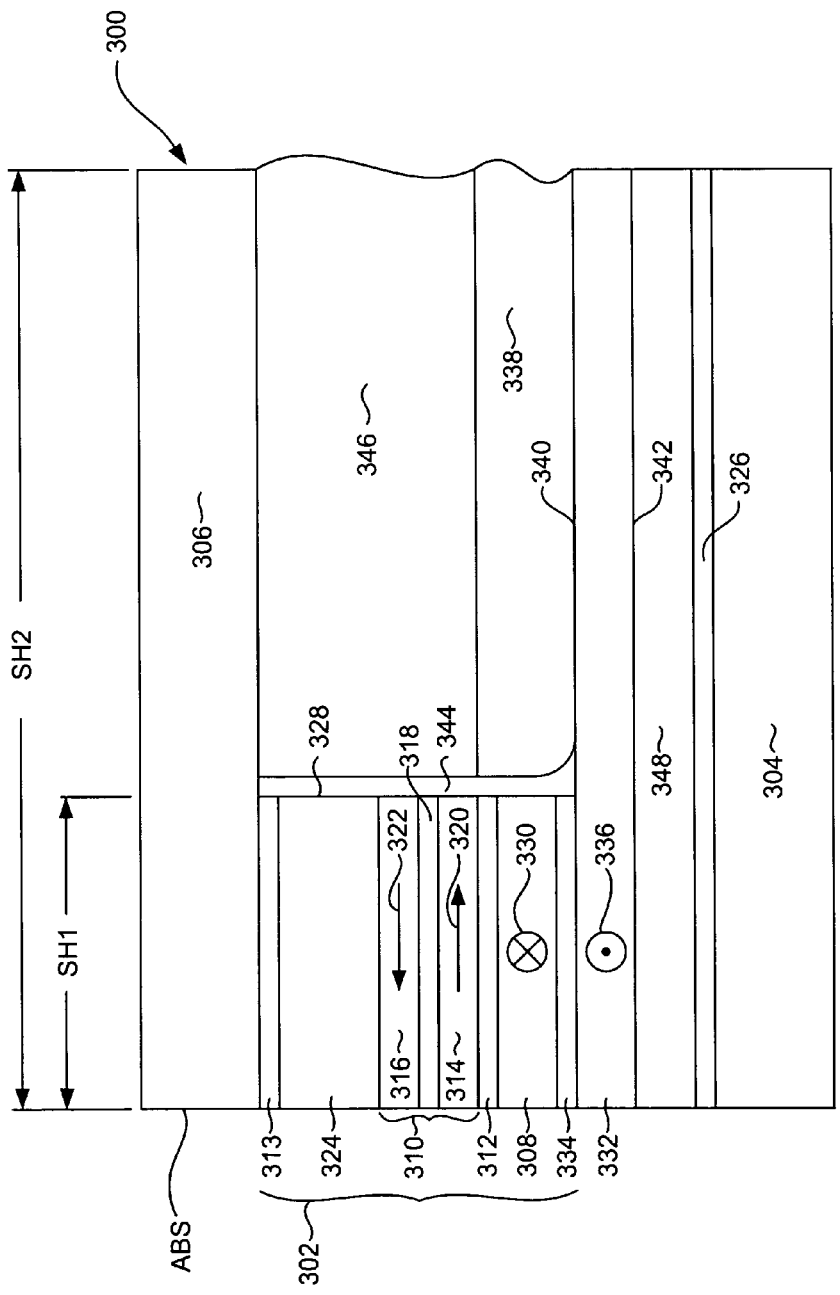
FIG. 3 is a cross sectional view of a magnetic sensor according to an embodiment of the present invention taken from line 3-3 of FIG. 2.

With reference now to FIG. 3, a magnetoresistive sensor 300 according to an embodiment of the invention includes a magnetoresistive sensor element or sensor stack 302, sandwiched between first and second leads 304, 306. The first and second leads 304, 306 can be constructed of an electrically conductive, magnetic material such as NiFe and can thereby serve as magnetic shields as well as leads.

The sensor stack 302 includes a magnetic free layer structure 308 and a magnetic pinned layer structure 310. A non-magnetic, electrically conductive spacer layer 312 such as Cu is sandwiched between the free and pinned layers. It should be pointed out that the present invention is being described as a current perpendicular to plane GMR sensor, however, the present invention could also be embodied in a tunnel valve sensor, in which case a non-magnetic, electrically insulating barrier layer such as alumina would be sandwiched between the free and pinned layers 308, 310 rather than the electrically conductive spacer layer 312. A capping layer 313, such as Ta may be provided at the top of the sensor stack 302 to protect the layers of the sensor stack 302 from damage during manufacture.

The pinned layer 310 may be an antiparallel coupled (AP coupled) pinned layer having a first magnetic layer AP1 314, and a second magnetic layer AP2 316, both of which are antiparallel coupled across an AP coupling layer 318 such as Ru. The AP1 and AP2 layers 314, 316 may be constructed of CoFe. The magnetic moment 320, 322 of each of the AP1 and AP2 layers 314, 316 can be pinned by a layer of antiferromagnetic material (AFM layer) 324 that is exchange coupled with the AP2 layer 316. The AFM layer 324 may be constructed of several materials such as PtMn or IrMn and is preferably PtMn. One or more seed layers 326 may be provided at the bottom of the sensor stack 302 to initiate a desired grain growth in the sensor stack 302.

The back edge 328 of the free layer 308, pinned layer 310 and spacer layer 312 (or one of the pinned and free layers) defines a first stripe height (SH1) of the sensor stack 302, measured from the ABS of the sensor 300. This back edge (SH1) defines the active area of the sensor. As those skilled in the art will appreciate, the ABS is the surface of the sensor that faces the medium during operation. As fly heights become ever smaller, there will soon become a point where it will be difficult to distinguish between flight and contact. Therefore, ABS as used herein should be understood to mean the medium facing surface of the sensor 300 (or slider 113).

The free layer has a magnetic moment 330 that is biased in a direction parallel with the ABS. Although the moment 330 of the free layer is biased parallel with the ABS it is free to rotate in response to a magnetic field. Biasing of the free layer moment 330 is achieved by an in-stack bias structure that includes a magnetic bias layer 332 that extends significantly beyond the first stripe height SH1 to a second stripe height dimension SH2. SH2 may be, for example, 1.5 to 3 times SH1, but is preferably about twice SH1. The bias layer 332 is separated from the free layer 308 by a non-magnetic, electrically conductive spacer layer 334. The spacer layer 334 can be constructed several non-magnetic, electrically conductive materials, such as Ru, and can have a thickness of for example about 20 Angstroms. The bias layer 332 is magnetostatically coupled with the free layer 308 across the spacer layer 334 and has a magnetic moment 336 that is parallel with the ABS and antiparallel with the moment 330 of the free layer 308.

The bias layer 332 is exchange coupled with a second AFM layer 338, which strongly pins the magnetic moment 336 of the bias layer 332. As can be seen, the bias layer has first and second sides 340, 342. The first side is located toward the spacer layer 334, free layer 308 and the rest of the sensor stack 302. In other words it is disposed toward the inside of the sensor 300. The second side 342 of the bias layer 332 is disposed away from the spacer layer 334, free layer 308, and is disposed toward the first shield 304. As can also be seen with reference to FIG. 3, the AFM layer 338 is exchange coupled to the first side 340 of the bias layer 332. The AFM layer 338 is also disposed entirely outside of the active area of the sensor, beyond the stripe height SH1 of the sensor 300.

The bias layer 332 is separated from the stripe height edge 328 of the sensor stack 302 by an in insulation layer 344, which may be constructed of several non-magnetic, electrically insulating materials, and is preferably constructed of tantalum oxide (TaO$_X$). The insulation layer 344 can be constructed by a process that includes, after defining the stripe height of the sensor stack 302, conformally depositing an insulation layer, such as by chemical vapor deposition, atomic layer deposition, etc., and then performing a directional material removal process, such as reactive ion etching to remove horizontally disposed portions of the sensor stack 302, leaving the insulation layer 344 remaining on the substantially vertical stripe height wall 328.

The AFM layer 338 is separated from the second shield 306 by a second insulation layer 346, which may be alumina (Al$_2$O$_3$) or some other non-magnetic, electrically insulating material. In an alternate embodiment, the insulation layers 344, 346 can be eliminated, and the AFM layer 338 can be constructed of an electrically insulating material, such as alpha-Fe$_2$O$_3$.

With reference still to FIG. 3, the AFM layer 338 strongly pins the magnetic moment 336 of the bias layer 332 in a direction parallel with the ABS in the non-active area of the bias layer 332 beyond the stripe height SH1. Use of negative magnetostrictive material for the bias layer 332 (e.g., NiFe, CoB, CoSiB, CoNb) will further improve the pinning strength by stress induced anisotropy caused by the compressive stress at the air bearing surface. These additional Co-based amorphous materials also provide stronger pinning with an IrMn antiferromagnet which is a preferred material for bias layer pinning. This pinning is maintained into the active area of the bias layer 332 within SH1. This moment 336 biases the moment 330 of the free layer 308 by magnetostatic coupling across the spacer layer 334. In order to further improve pinning of the moment 336 of the bias layer 332, a second bias layer pinning AFM layer 348 can be provided. This second bias layer pinning AFM layer 348 would be exchange coupled to the second side 342 of the bias layer 332 away from the spacer and free layers 334, 308. Since it is located away from the free layer and spacer layer 308, 344, it can extend both within the active area (within SH1) and beyond SH1 into the inactive area of the sensor 300. This additional AFM layer can improve the pinning of the bias layer 332. However, this additional pinning is at the expense of additional gap thickness. Therefore, the decision of whether or not to add the additional bias pinning layer 326 can be determined by design considerations.

It should be pointed out that, although the sensor 300 has been described as a current perpendicular to plane (CPP) sensor the invention could also be embodied in a current in plane (CIP) in which case, electrically insulating gap layers would be provided at the top and bottom of the sensor. In addition, the invention could be embodied in a tunnel valve rather than a GMR sensor, in which case the spacer 312 would be a non-magnetic, electrically insulating barrier layer.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetoresistive sensor, comprising:
   a magnetic free layer having a back edge defining a stripe height as measured from an air bearing surface (ABS);
   an in stack bias layer that extends beyond the stripe height, the in stack bias layer having first and second sides;
   a non-magnetic spacer layer sandwiched between the bias layer and the free layer, the first side of the bias layer being adjacent to the spacer and the second side being away from the sensor; and
   a layer of antiferromagnetic material (AFM layer) exchange coupled to the first side of the bias layer, the AFM layer being entirely beyond the stripe height defined by the free layer.

2. A sensor as in claim 1 wherein the AFM layer pins a magnetic moment of the bias layer in a direction parallel with the ABS.

3. A sensor as in claim 1 wherein the AFM layer pins a magnetic moment of the bias layer in a first direction parallel with the ABS and wherein magnetostatic coupling between the bias layer and the free layer biases a magnetic moment of the free layer in a second direction that is parallel with the ABS and antiparallel with the first direction.

4. A magnetoresistive sensor as in claim 1 further comprising a layer of electrically insulating material separating the AFM layer from the free layer.

5. A magnetoresistive sensor as in claim 1 further comprising a layer of electrically insulating material separating the AFM layer from the free layer and from the spacer layer.

6. A magnetoresistive sensor as in claim 1 further comprising a layer of tantalum oxide separating the AFM layer from the free layer.

7. A magnetoresistive sensor as in claim 1 further comprising a first insulation layer separating the AFM layer from the free layer and a second insulation layer formed on a surface of the AFM layer opposite the bias layer.

8. A magnetoresistive sensor as in claim 1 further comprising a first insulation layer comprising tantalum oxide separating the AFM layer from the free layer and a second insulation layer comprising alumina formed on a surface of the AFM layer opposite the bias layer.

9. A magnetoresistive sensor as in claim 1 wherein the AFM layer comprises IrMn.

10. A magnetoresistive sensor as in claim 1 wherein the AFM layer comprises PtMn.

11. A magnetoresistive sensor as in claim 1 further comprising a second AFM layer exchange coupled to the second side of the bias layer.

12. A magnetoresistive sensor as in claim 1 further comprising a second AFM layer exchange coupled to the second side of the bias layer, the second AFM layer having a portion disposed within the active area of the sensor and a portion extending beyond the stripe height into the inactive area of the sensor.

13. A magnetoresistive sensor as in claim 1 wherein the bias layer comprises a material selected from the group consisting of NiFe, CoB, CoSiB, CoNb.

14. A magnetoresistive sensor having an air bearing surface (ABS), comprising:
    a free layer;
    a pinned layer structure;
    a first AFM layer exchange coupled with the pinned layer structure to pin a magnetic moment of the pinned layer in a direction perpendicular to the ABS, the free layer, pinned layer and first AFM layer each terminating at a back edge at a stripe height that defines an active area of the sensor;
    a first non-magnetic layer sandwiched between the free layer and the pinned layer;
    a magnetic bias layer;
    a second non-magnetic layer sandwiched between the bias layer and the free layer, the second non-magnetic layer contacting a first side of the bias layer; and
    a second AFM layer contacting the first side of the bias layer, the second AFM layer being exchange coupled with the bias layer to pin a magnetic moment of the bias layer in a first direction parallel with the ABS, the second AFM layer being located entirely beyond the stripe height outside of the active area of the sensor.

15. A magnetoresistive sensor as in claim 14 wherein the first and second AFM layers are constructed of different materials.

16. A magnetoresistive sensor as in claim 14 wherein the first AFM layer comprises PtMn and the second AFM layer comprises IrMn.

17. A magnetoresistive sensor as in claim 14 further comprising a third AFM layer contacting a second side of the bias layer opposite the first side.

18. A magnetoresistive sensor as in claim 14 further comprising a third AFM layer exchange coupled with the bias layer and contacting a second side of the bias layer opposite the first side, the third AFM layer having a portion disposed within the active area of the sensor.

19. A magnetoresistive sensor as in claim 14 further comprising a layer of electrically insulating material separating the second AFM layer from the free layer, pinned layer structure and first AFM layer.

20. A magnetoresistive sensor as in claim 1 wherein the AFM layer comprises an electrically insulating material.

21. A magnetoresistive sensor as in claim 14 wherein the AFM layer comprises an electrically insulating material.

22. A magnetic data recording system, comprising:
a magnetic medium;
an actuator;
a slider connected with the actuator for movement adjacent to a surface of the magnetic medium; and
a magnetoresistive sensor connected with the slider, the magnetoresistive sensor comprising:

a magnetic free layer having a back edge defining a stripe height as measured from an air bearing surface (ABS);

an in stack bias layer that extends beyond the stripe height, the in stack bias layer having first and second sides;

a non-magnetic spacer layer sandwiched between the bias layer and the free layer, the first side of the bias layer being adjacent to the spacer and the second side being away from the sensor; and a layer of antiferromagnetic material (AFM layer) exchange coupled to the first side of the bias layer, the AFM layer being entirely beyond the stripe height defined by the free layer.

* * * * *